US007902719B2

(12) United States Patent
Hull (10) Patent No.: US 7,902,719 B2
(45) Date of Patent: Mar. 8, 2011

(54) APPARATUS AND METHOD FOR AFFECTING PHYSICAL PARAMETER ASSOCIATED WITH A SHAFT

(75) Inventor: John Ralph Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 343 days.

(21) Appl. No.: 12/019,740

(22) Filed: Jan. 25, 2008

(65) Prior Publication Data

US 2009/0189484 A1    Jul. 30, 2009

(51) Int. Cl.
*H01L 41/08* (2006.01)
(52) U.S. Cl. ......................................................... 310/317
(58) Field of Classification Search .......... 310/317–318, 310/52, 328, 323.02; H10L 41/08
See application file for complete search history.

(56) References Cited

U.S. PATENT DOCUMENTS 7,170,214 B2 * 1/2007 Henderson et al. ...... 310/323.02
7,339,306 B2 * 3/2008 Henderson ............... 310/323.02

OTHER PUBLICATIONS

Timoshenko, S.; Vibration Problems in Engineering; D. Van Nostrand Company, Inc., New York, New York; 1928; pp. 331-336; pp. 342-343; pp. 368-370.
Crawley, Edward F. and de Luis, Javier; Use of Piezoelectric Actuators as Elements of intelligent Structures; AIAA Journal, vol. 25, No. 10; May 1986; pp. 1373-1358.
Nonami, Kenzou; DiRusso, Eliseo and Fleming, David P.; Active Vibration Control for Flexible Rotor by Optimal Direct-Output Feedback Control; NASA Technical Memorandum Prepared for the 12th Biennial Conference on Mechanical Vibration and Noise; American Society of Mechanical Engineers; Montreal, Canada; Sep. 17-20, 1989.
Okada, Yohji and Saitoh, Takashi; Vibration Control of Flexible Rotor Supported by Inclination Control Magnetic Bearings; Proceedings of the 1999 IEEE / ASME International Conference on Advanced Intelligent Mechatronics; Atlanta, GA; Sep. 19-23, 1999.
Davis. Christopher L. and Lesieutre, George A.; An Actively Tuned Solid-State Vibration Absorber Using Capacitive Shunting of Piezoelectric Stiffness; Journal of Sound and Vibration, 2000; pp. 601-617.
Cunefare, Kenneth; State-Switched Absorber for Vibration Control of Point-Excited Beams; Journal of Intelligent Material Systems and Structures, vol. 13; Feb.-Mar. 2002; pp. 97-105.

* cited by examiner

*Primary Examiner* — Thomas M Dougherty
*Assistant Examiner* — Karen Addison
(74) *Attorney, Agent, or Firm* — Law Office of Donald D. Mondul (57) ABSTRACT

An apparatus for affecting at least one physical parameter associated with a shaft oriented about a longitudinal axis includes: a piezoelectric tubular member in a substantially osculatory coaxial relation with at least a portion of the shaft; and at least one electrical network coupled with the piezoelectric tubular member for switchingly completing an electrical path through the piezoelectric tubular member.

8 Claims, 6 Drawing Sheets

APPARATUS AND METHOD FOR
AFFECTING PHYSICAL PARAMETER
ASSOCIATED WITH A SHAFT

FIELD

The present invention is directed to rotors and similar rotating shaft structures, and especially to rotors and shafts exhibiting flex-mode or bending-mode vibrations while rotating.

BACKGROUND

Rotors and shafts may operate in a supercritical regime (i.e., at rotational frequencies above the resonant frequency of the shaft and any supporting bearings). Higher speeds may enable higher energy and power density to permit using lighter weight components. Practical applications may include, by way of example and not by way of limitation, flywheel energy storage, airplane engines, and helicopter drive shafts. As long as a rotor is rigid, supercritical operation generally gives stable performance. As the rotational frequency increases, a rotor may eventually experience flex-mode or bending-mode vibrations. Passing through the resonant rotational frequency of such vibrational modes may be problematic. Energy may be dissipated in a resonant frequency rotational mode. Power from a drive source may need to be greater than the energy dissipated in order to continue driving the rotor or shaft. During times when greater energy may be applied from a drive source, considerable stresses may be exerted on the rotor or shaft. Vibrational amplitude when greater energy may be applied from a drive source may be so large that the rotor may impact surrounding structure about the rotor or shaft.

Previous techniques for damping shaft vibrations may have included squeeze-film dampers, active magnetic bearings that apply control forces to the rotating shaft or linear actuators that contact conventional bearing housings and apply control forces to the bearing housings. Piezoelectric materials may have been used in structures arranged to damp vibrations in beams. Piezoelectric materials may have been used as an analog to magnetic bearings in which an applied voltage may control a piezoelectric patch to apply a force to directly oppose motion of a beam to which the piezoelectric patch may be mounted. Variable stiffness to control vibration may have also included shape-memory alloys and magnetorheological elastomers.

Variable stiffness properties of piezoelectrics may have been used to semi-actively tune vibration absorbers, such state-switched absorbers may change the resonant frequency of a beam and may be matched to optimally transform vibrational energy into electrical energy.

There is a need for an apparatus and method for affecting physical parameters of a shaft including changing frequency of vibrational modes of a shaft to reduce vibration while rotating the shaft, especially at resonant frequencies.

SUMMARY

An apparatus for affecting at least one physical parameter associated with a shaft oriented about a longitudinal axis includes: a piezoelectric tubular member in a substantially osculatory coaxial relation with at least a portion of the shaft; and at least one electrical network coupled with the piezoelectric tubular member for switchingly completing an electrical path through the piezoelectric tubular member.

A method for changing at least one characteristic of a shaft oriented longitudinally about an axis includes: (a) in no particular order: (1) providing at least one piezoelectric tubular member in a substantially press-fit relation coaxial with the shaft; and (2) providing at least one electrical network coupled with the piezoelectric tubular member; and (b) operating the at least one electrical network to selectively switchingly complete an electrical path through the piezoelectric tubular member.

It is, therefore, a feature of the present invention to provide an apparatus and method for affecting physical parameters of a shaft including changing frequency of vibrational modes of a shaft to reduce vibration while rotating the shaft, especially at resonant frequencies.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
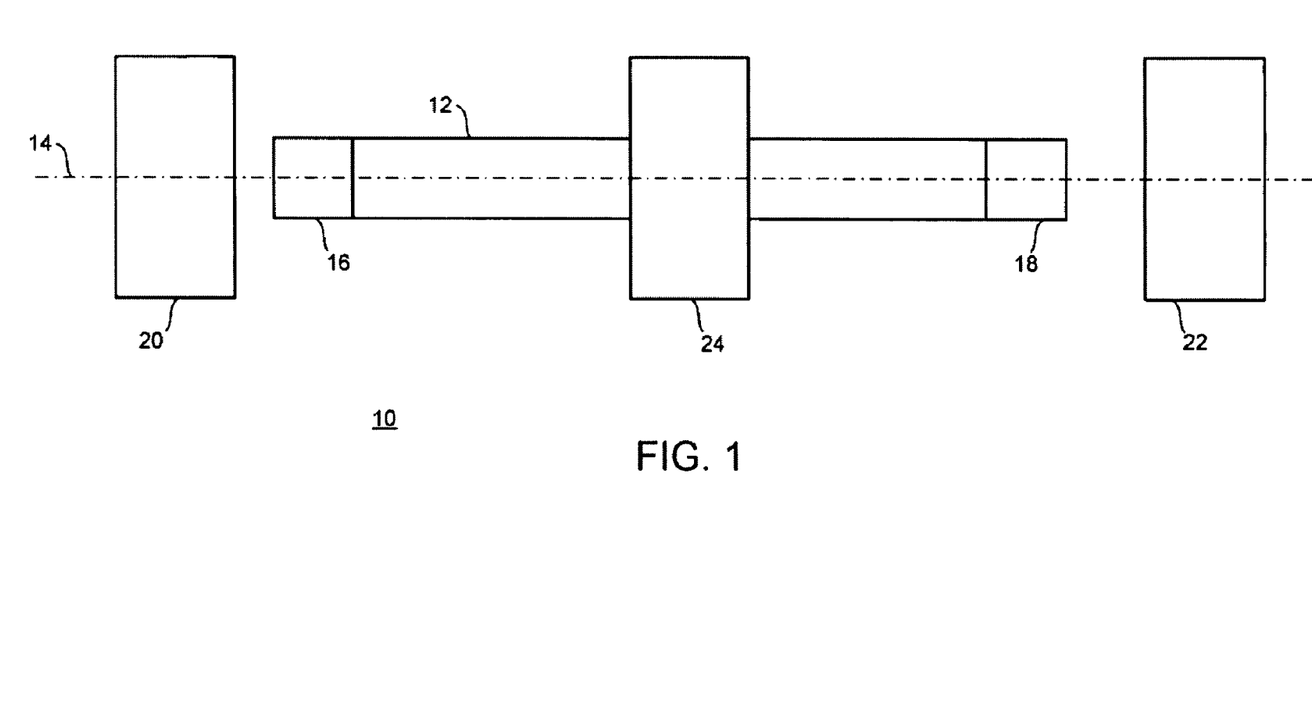
FIG. 1 is a schematic view of a shaft or tube configured for levitation with magnetic beatings.

FIG. 1 is a schematic view of a shaft or tube configured for levitation with magnetic beatings. In FIG. 1, a system 10 may include a tube or shaft 12 oriented about an axis 14. Shaft 12 may be, by way of example and not by way of limitation, a composite tube, e.g., carbon fibers embedded in a resin-binder matrix, or shaft 12 may be a metallic tube. Shaft 12 may include permanently magnetized portions 16, 18. Permanently magnetized portions 16, 18 may be axially magnetized. High-Temperature Superconducting (HTS) bulk elements 20, 22 may be configured for surrounding shaft 12 substantially axially in register with permanently magnetized portions 16, 18 in order to effect levitating support of shaft 12. A stator unit 24 may be affixed with shaft 12 to facilitate driving shaft 12 rotationally about axis 14 in cooperation with a rotor member (not shown in FIG. 1, but known to those skilled in the art of shaft driving systems). Stator unit 24 may create a rotating magnetic field in a direction substantially transverse with axis 14.

Treating the tube or shaft 12 as a composite tube configured to behave as an Eulerian beam one may let shaft 12 have a Young's modulus E and have a moment I, a density $\rho$, a cross-sectional area A and a length L. One may assume shaft 12 has a damping equivalent to viscous damping constant C0.

One may treat the two HTS bearings 20, 22 as one unit (hereinafter referred to as "the HTS"). One may let the HTS have a mass m and may let the HTS be coupled with shaft 10 with spring constant K1 and damping C1. One may let the HTS be coupled to the ground (or another solid base reference) with a spring constant K2 and damping C2. For now, one may ignore any effects of permanently magnetized portions 16, 18 on system 10.

Considering motions in one transverse direction, one may let q denote the generalized amplitude of a normal mode vibration of shaft 12. One may let z denote the amplitude of the HTS motion in the same direction. The Lagrangian for system 10 may be:

$$L = (\rho AL/2)(dq/dt)^2 + (m/2)(dz/dt)^2 - EI\beta^4/(2L^3)q^2 - (K1/2)(2q-z)^2 - (K2/2)z^2 \qquad [1]$$

and the dissipation term may be $$D = (C0/2)(dq/dt)^2 + (C2/2)(dz/dt)^2 + (C1/2)(2dq/dt - dz/dt)^2 \qquad [2]$$

One may assume an external force that acts on the q coordinate of the form $e(\rho AL)\omega^2$, where e is the center of mass offset and $\omega$ is the rotational velocity in rad/s.

To address the subject of vibrational frequencies, one may evaluate system 10 using Lagrange's equations. There may be two frequencies that appear.

$$\omega\text{-}r = [(EI\beta^4 + 4K1L^3)/(\rho AL^4)]^{1/2} \qquad [3]$$

and $$\omega\text{-}f = [(K1+K2)/m]^{1/2} \qquad [4]$$

where $\omega$-r may be the vibrational frequency of the rotor and $\omega$-f may be the frequency of the foundation (in this case, the HTS). One may note that, in general, K1 is small due to the nature of the magnetic levitational force and thus may not significantly affect the shaft vibrational frequency. Because the shaft vibration is essentially that of a shaft with both ends free, the term $\beta$ may be given by the equation $$\cos kL + \cos hkL = 1 \qquad [5]$$

so that $\beta = kL = 0, 4.73, 7.853, 10.996, \ldots$ [6]

Regarding vibrational amplitude, one may solve for q/e from the set of coupled equations, which has the form $$q/e = (N_R + iN_I)/(D_R + iD_I) \qquad [7]$$

where $$N_R = \omega^2(\omega\text{-}f^2 - \omega^2) \quad N_I = \omega^3(C1+C2)/m \qquad [8]$$

$$D_R = (\omega\text{-}r^2 - \omega^2)(\omega\text{-}f^2 - \omega^2) - [\omega^2(C0+4C1)(C1+C2) - 4(K1^2 - \omega^2 C1)]/(m\rho AL) \qquad [9]$$

$$D_I = (\omega\text{-}r^2 - \omega^2)\omega(C1+C2)/m + (\omega\text{-}f^2 - \omega^2)\omega(C0+4C1)/(\rho AL) - 8\omega K1 C1/(m\rho AL) \qquad [10]$$

The above equations may be used to find the amplitude as a function of frequency. Analytically, it may be profitable to explore the amplitude at resonance, i.e., $\omega = \omega$-r. The denominator terms become $$D_R = -[\omega^2(C0+4C1)(C1+C2) - 4(K1^2 - \omega^2 C1)]/(m\rho AL) \qquad [11]$$

$$D_I = (\omega\text{-}f^2 - \omega^2)\omega(C0+4C1)/(\rho AL) - 8\omega K1 C1/(m\rho AL) \qquad [12]$$

One may be interested in the behavior at resonance when $\omega$ is large, i.e., $\omega \gg \omega$-f. One may note that $C1 \ll C0, C2$. In this case, $$q_R/e = -4C1^2 \rho AL/(C0^2 m) \qquad [13]$$

$$q_I/e = -\omega \rho AL/C0 \qquad [14]$$

The $q_I$ term may be the important one whose amplitude grows with each successive resonance. Trying a tuned damper with $\omega$-f=$\omega$-r may result in the same expression for $q_I$/e. One may find that K2 and C2 (C1, m, and K1 also) have little effect on the vibrational amplitude at resonance.

Regarding active magnetic damping, one may configure the motor windings in stator unit 24 to oppose the center of mass offset force in order to damp out flex-mode vibrations. One may disperse stator unit 24 somewhat axially so as not to sit substantially on a vibrational node. However, operation at high rotational frequencies may make such an approach problematic. In such an arrangement, one must design a feedback system that can function as a fraction of a revolution in order for feedback to be effective.

Regarding piezoelectric stiffness tuning, one may examine changing the vibrational frequency by changing the effective stiffness of the tube. Such an approach may have an advantage in that it is a semi-passive approach and need not operate very quickly to be effective.

Figure 2:
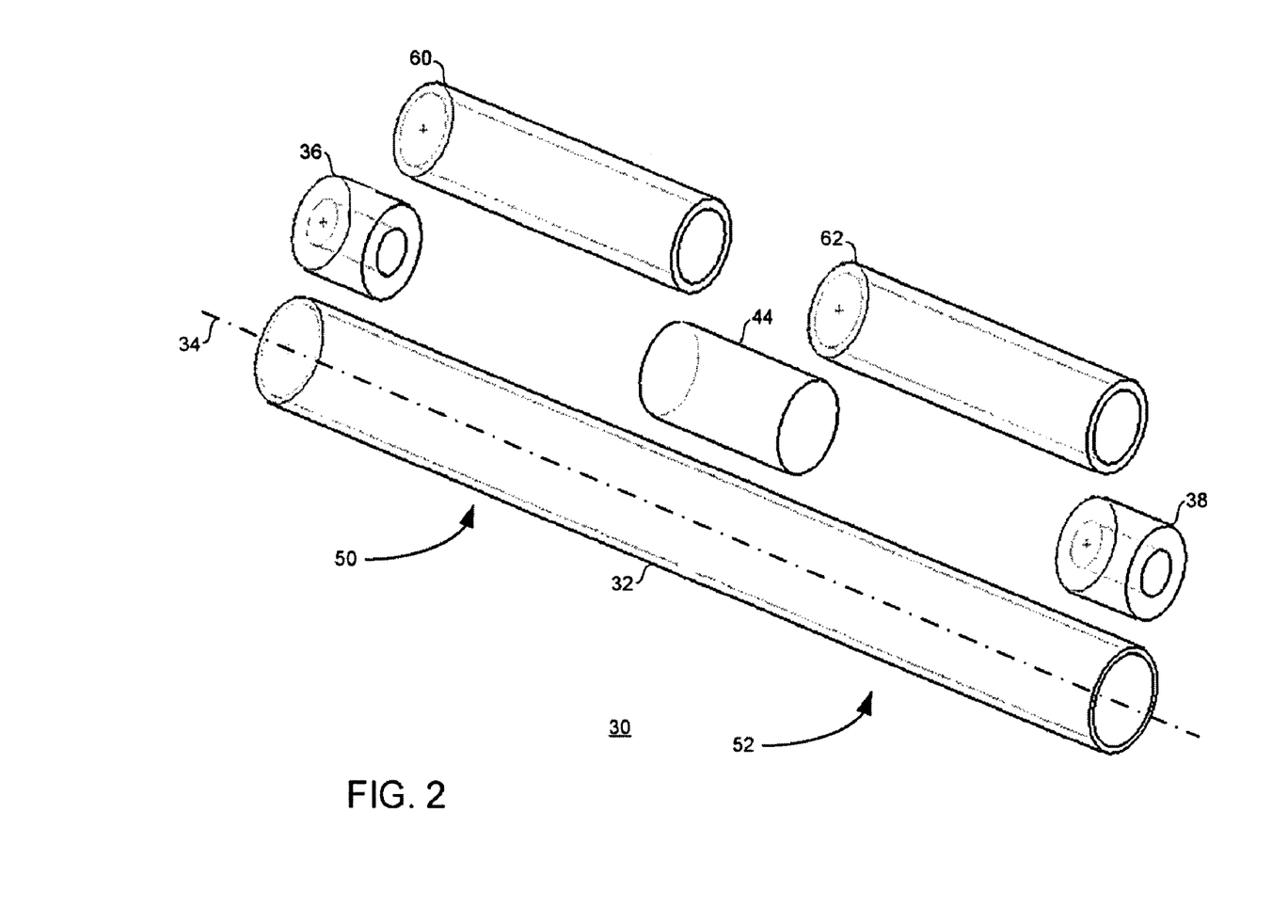
FIG. 2 is an exploded schematic drawing of a first embodiment of the apparatus of the invention.

FIG. 2 is an exploded schematic drawing of a first embodiment of the apparatus of the invention. In FIG. 2, a system 30 may include a tube 32 oriented about an axis 34. Permanently magnetized elements 36, 38 may be axially or radially magnetized and configured for non-slip fitting with tube 32 inside tube 32 or outside tube 32. It is preferred that permanently magnetized elements 36, 38 fit inside tube 32 in a press fit relation. Other affixing systems may be employed instead or in combination such as, by way of example and not by way of limitation, adhesive and heating of tube 32 while inserting permanently magnetized elements 36, 38 and permitting the resin binder in tube 32 to cool and adhere with permanently magnetized elements 36, 38. High-Temperature Superconducting (HTS) elements may be employed for supporting tube 32 (generally as described in connection with FIG. 1) but are not illustrated in FIG. 2 in order to avoid cluttering FIG. 2. A motor/generator rotor unit 44 may be affixed with tube 32 either inside or outside tube 32 to facilitate driving shaft 12 rotationally about axis 34 in cooperation with a stator member (not shown in FIG. 2, but known to those skilled in the art of shaft driving systems). Motor/generator rotor unit 44 may be permanently magnetized in a direction substantially transverse with axis 34.

Because tube 32 may be supported while rotating in the vicinities of permanently magnetized elements 36, 38 and motor/generator rotor unit 44, any vibrational node about which flexing may occur in tube 32 while rotation may likely occur between permanently magnetized elements 36, 38 and motor/generator rotor unit 44 in loci generally indicated at 50, 52 in FIG. 2.

Piezoelectric elements 60, 62 may be affixed with tube 32 in the vicinities of loci 50, 52, preferably to span vibrational nodes between permanently magnetized elements 36, 38 and motor/generator rotor unit 44. Vibrational nodes may not be the optimal location for placing piezoelectric elements 60, 62 in all situations. Bending at a node may be minimal, so stiffening the structure of tube 32 in a vibrational node may have minimal impact. A better location for piezoelectric elements 60, 62 may be between a vibrational node and the locus of vibrational amplitude peaks in some structures.

Permanently magnetized elements 36, 38 may be axially or radially magnetized and configured for non-slip fitting with tube 32 inside tube 32 or outside tube 32. It is preferred that piezoelectric elements 60, 62 fit inside tube 32 in a press fit relation. However, piezoelectric elements 60, 62 may be affixed outside tube 32 in a press fit relation surrounding relation with tube 32. Other affixing systems may be employed instead or in combination such as, by way of example and not by way of limitation, adhesive and heating of tube 32 while inserting piezoelectric elements 60, 62 and permitting the resin binder in tube 32 to cool and adhere with piezoelectric elements 60, 62. It is preferred that piezoelectric elements 60, 62 be established with substantially complete face-to-face contact with tube 32 in a substantially oscillatory relation coaxially oriented about axis 34.

Establishing an electric field across one or both of piezoelectric elements 60, 62 may effect a stiffening of the piezoelectric element 60, 62 across which the electric field is established. Introducing a stiffening effect in the vicinity of a vibrational node about which flexing may occur in tube 32, generally indicated at 50, 52, may reduce flexing by tube 32. As mentioned earlier herein, vibrational nodes may not be the optimal location for placing piezoelectric elements 60, 62 in all situations. Bending at a node may be minimal, so stiffening the structure of tube 32 in a vibrational node may have minimal impact. A better location for piezoelectric elements 60, 62 may be between a vibrational node and the locus of vibrational amplitude peaks in some structures. Reducing flexing by tube 32 may permit tube 32 to be rotated at speeds greater than critical speeds at which resonant vibrational frequencies occur without having to expend as much energy as may be required when accelerating rotation through such critical speeds without the aid of a stiffening effect.

Figure 3:
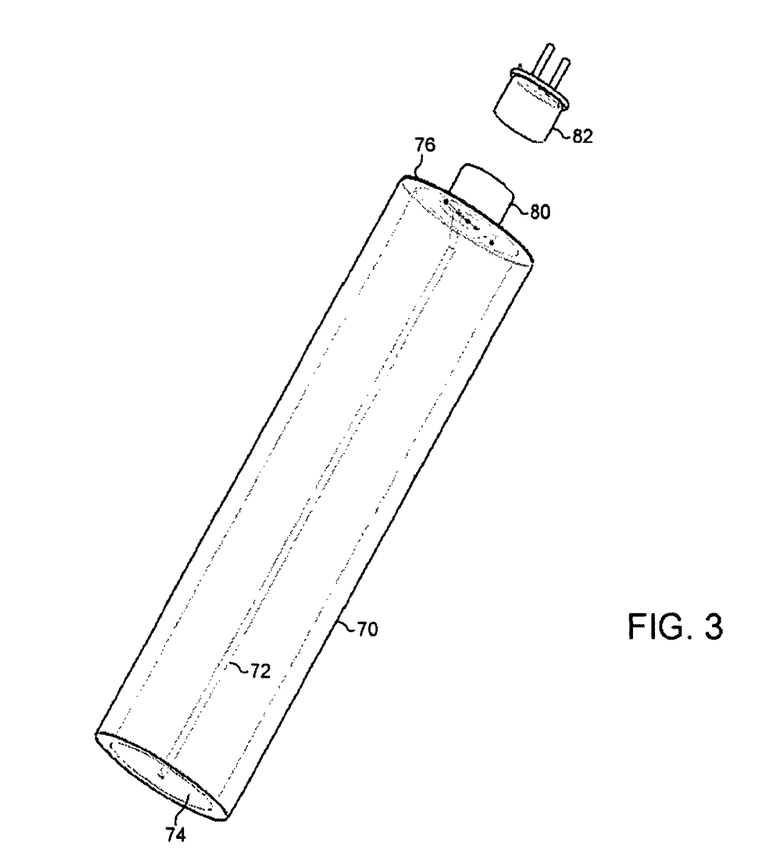
FIG. 3 is a schematic diagram of details of the first embodiment of the apparatus of the invention illustrated in FIG. 2.

FIG. 3 is a schematic diagram of details of the first embodiment of the apparatus of the invention illustrated in FIG. 2. In FIG. 3, a piezoelectric element 70 may be polarized so that to place an electric field across piezoelectric element 60 one may merely couple ends of piezoelectric element 60 electrically in common. The effect of polarizing a piezoelectric element will be discussed in connection with FIGS. 4-6.

Piezoelectric element 70 is provided with a conductor 72 coupling a pair of electrodes 74, 76 at opposite ends of piezoelectric element 70. Each of electrodes 74, 76 is electrically coupled with piezoelectric element 70. It may be preferred that electrodes 74, 76 be substantially embodied in electrically conductive circular discs having a diameter substantially the same as a diameter of piezoelectric element 70. Conductor 72 may be electrically coupled with electrode 74. A photodiode 80 may be coupled between conductor 72 and electrode 76 to provide a switching connection between conductor 72 and electrode 76. Details of the switching connection are not shown in FIG. 3, but may be understood by one skilled in the art of photodiode employment in electrical circuits.

A light source 82 is situated in a position for illuminating photodiode 80. It may be preferred that light source 82 not be affixed with piezoelectric element 70 or with tube 32 (FIG. 2) in order to avoid affecting center of mass or other rotational parameter associated with rotation of tube 32. By way of example and not by way of limitation, light source 82 may be embodied in a Light Emitting Diode (LED).

Photodiode 80 may respond to illumination by light from light source 82 to close an electrical path between electrodes 74, 76 via conductor 72 to place an electric field across polarized piezoelectric element 70. Placement of an electric field across piezoelectric element 70 may cause piezoelectric element 70 to alter its stiffness, and thereby affect stiffness of an attached tube, such as tube 32 (FIG. 2).

By way of example and not by way of limitation, photodiode 80 may be attached to electrode 76. One lead from photodiode 80 may be connected to electrode 76. Another lead from photodiode 80 may pass through a hole in electrode 76 and connect to conductor 72. Conductor 72, by way of example and not by way of limitation, may pass along the axis of the system (e.g., axis 34; FIG. 2) and connect to electrode 74. To aid in establishing mechanical integrity, there may be other filler material within piezoelectric element 70 to contain the conductor 72. Filler material may also be provided to affix photodiode 80 in place substantially at the axis of the system (e.g., axis 34; FIG. 2).

Light source 82 may be attached with a stationary portion of the system, such as a stator element (not shown in FIG. 3). Either light source 82 or light from light source 82 may enter the interior of tube 32 through a central aperture in a permanently magnetized element 36, 38 (FIG. 2). When light illuminates photodiode 80, photodiode 80 may conduct, an electric short is established between electrodes 74, 76 and piezoelectric element 70 is in a shorted state. When light does not illuminate photodiode 80, photodiode 80 may not conduct, an electric open is established between electrodes 74, 76 and piezoelectric element 70 is in an open state.

Photodiode 80 may be placed along the axis 34 of tube 32 (FIG. 2) to minimize the stresses that photodiode 80 experiences due to centrifugal force while tube 32 rotates. Photodiode 80 may also be placed along the axis 34 of tube 32 to minimize the impact on balancing tube 32. In general, photodiode 80 may be placed anywhere near piezoelectric element 70 such as, by way of example and not by way of limitation on an inner surface of tube 32. Suitable additional mass may be added elsewhere to achieve rotor balance, and the strength of photodiode 80 must be sufficient to survive forces to which it may be subjected during operation.

Figures 4, 5, 6:
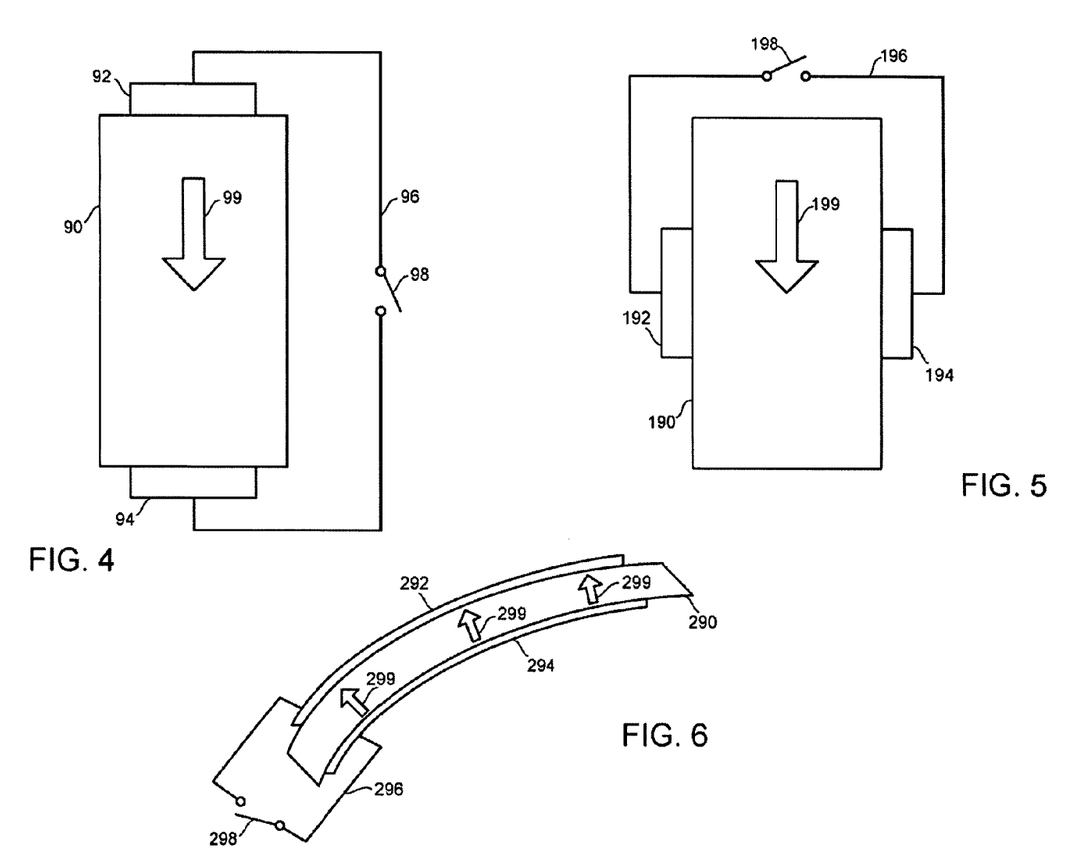
FIG. 4 is a schematic diagram of a first embodiment of an electric network coupled with a polarized piezoelectric element.
FIG. 5 is a schematic diagram of a second embodiment of an electric network coupled with a polarized piezoelectric element.
FIG. 6 is a schematic diagram of a third embodiment of an electric network coupled with a polarized piezoelectric element.

FIG. 4 is a schematic diagram of a first embodiment of an electric network coupled with a polarized piezoelectric element. In FIG. 4, a piezoelectric element 90 presents electrodes 92, 94 to which is coupled an electrical network 96. Electrical network 96 may be switchingly controlled by a switch element 98. Piezoelectric element 90 may be polarized in a direction indicated by an arrow 99. Closing switch element 98 may establish a closed condition between electrodes 92, 94 with electrodes 92, 94 electrically coupled in common. Opening switch element 98 may establish an open condition between electrodes 92, 94 with no electrical connection between electrodes 92, 94. Piezoelectric element 90 may be more stiff when electrical network 96 is in an open condition than when electrical network 96 is in a closed condition.

FIG. 5 is a schematic diagram of a second embodiment of an electric network coupled with a polarized piezoelectric element. In FIG. 5, a piezoelectric element 190 presents electrodes 192, 194 to which is coupled an electrical network 196. Electrical network 196 may be switchingly controlled by a switch element 198. Piezoelectric element 190 may be polarized in a direction indicated by an arrow 199. Closing switch element 198 may establish a closed condition between electrodes 192, 194 with electrodes 192, 194 electrically coupled in common. Opening switch element 198 may establish an open condition between electrodes 192, 194 with no electrical connection between electrodes 192, 194. Piezoelectric element 190 may be more stiff when electrical network 196 is in an open condition than when electrical network 196 is in a closed condition.

Orienting electrodes 192, 194 with respect to direction 199 of polarization may yield a smaller difference between an open condition and a closed condition than may be experienced with the orientation of electrodes 92, 94 with respect to direction 99 of polarization (FIG. 4).

FIG. 6 is a schematic diagram of a third embodiment of an electric network coupled with a polarized piezoelectric element. In FIG. 6, a curved piezoelectric element 290 presents electrodes 292, 294 to which is coupled an electrical network 296. Electrical network 296 may be switchingly controlled by a switch element 298. Piezoelectric element 290 may be polarized in a radial direction indicated by arrows 299. Closing switch element 298 may establish a closed condition between electrodes 292, 294 with electrodes 292, 294 electrically coupled in common. Opening switch element 298 may establish an open condition between electrodes 292, 294 with no electrical connection between electrodes 292, 294. Piezoelectric element 290 may be more stiff when electrical network 296 is in an open condition than when electrical network 296 is in a closed condition.

Figure 7:
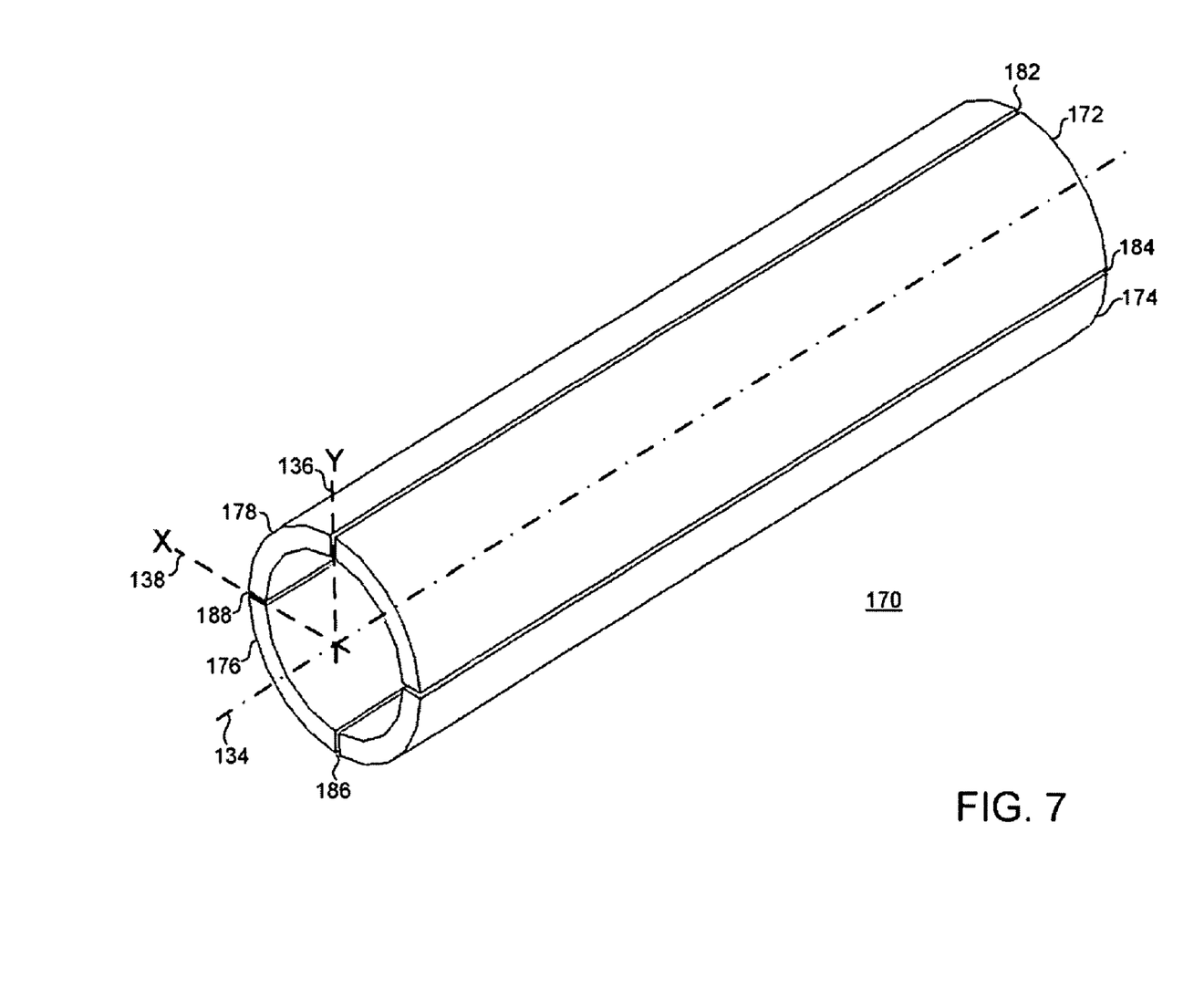
FIG. 7 is a schematic diagram of a second embodiment of the apparatus of the invention.

FIG. 7 is a schematic diagram of a second embodiment of the apparatus of the invention. In FIG. 7, a piezoelectric unit 170 may include a plurality of piezoelectric elements 172, 174, 176, 178 oriented generally in a cylindrical arrangement about a longitudinal axis 134. Piezoelectric element 170 may be situated relative to a Y-axis 136 and an X-axis 138. Piezoelectric elements 172, 174, 176, 178 may be separated by dividing gaps 182, 184, 186, 188 to assure electrical and physical independence among piezoelectric elements 172, 174, 176, 178. Piezoelectric elements 172, 174, 176, 178 may be electrically equipped for selective electrical treatment substantially as described in connection with FIG. 3 in a manner assuring a capability for individual electrical actuation among piezoelectric elements 172, 174, 176, 178.

One may employ four light sources and four photodetectors (not shown in FIG. 7). One light source and one photodetector may be associated with each respective piezoelectric element 172, 174, 176, 178. Each respective light source may operate at a different frequency. Each respective photodetector may be equipped with an optical filter to sensitize the respective photodetector to the respective frequency of its associated light source and to ignore the light from the other light sources. Digitally transmitting light in a predetermined series of pulses may also be employed to distinguish among light sources for discrimination by photodetectors.

Piezoelectric elements 172, 174, 176, 178 may be affixed with a rotor such as, by way of example and not by way of limitation, tube 32 (FIG. 2) to cancel residual imbalance of the rotor that may provide a force to deform the rotor. One may control the stiffness of each respective piezoelectric element 172, 174, 176, 178 by operating between open-circuit and short-circuit conditions of a polarized piezoelectric substantially as described in connection with FIGS. 2-6.

Regarding FIGS. 2 and 7 together, one may observe that when tube 32 spins, centrifugal force may cause piezoelectric material in a piezoelectric unit 170 installed with rotor 32 (having piezoelectric elements 172, 174, 176, 178) to deform. Piezoelectric elements 172, 174, 176, 178 may be supported by the stiffer material of tube 32, such as by way of example and not by way of limitation, a carbon-fiber material. By way of example and not by way of limitation, when piezoelectric unit 170 is installed inside of tube 32, the piezoelectric material of piezoelectric elements 172, 174, 176, 178 generally nearer to axis 134 may compress relative to the portions of piezoelectric material of piezoelectric elements 172, 174, 176, 178 abutting the inside surface of tube 32. The degree of compression experienced by each of piezoelectric elements 172, 174, 176, 178 may vary according to relative stiffness of each respective piezoelectric element 172, 174, 176, 178. The centrifugal force may act to compress the piezoelectric material; to a first approximation the amount of compression of each respective piezoelectric element 172, 174, 176, 178 may vary inversely with its respective stiffness. That is, a stiffer material may compress less than a less-stiff material.

By way of illustration, as a rotor with piezoelectric unit 170 installed may be rotated and approach a bending-mode critical frequency, the rotor may deform where piezoelectric unit 170 is located along X-axis 138. Such a deformation may indicate that the rotor has an integrated center of mass offset along X-axis 138 for this rotational mode. It may be advantageous to add extra mass along X-axis 138 on the opposite side of axis 134 to counter the offset of the center of mass. Such a result may be accomplished by increasing stiffness of piezoelectric elements 176, 178 and decreasing stiffness of piezoelectric elements 172, 174. By thus altering relative stiffness among piezoelectric elements 172, 174, 176, 178, piezoelectric elements 172, 174 may be compressed more and may contribute their respective mass distributions at a greater radius from axis 134 than will piezoelectric elements 176, 178.

It may be desirable to be able to adjust the stiffness of piezoelectric elements 172, 174, 176, 178 to any value between its respective maximum and minimum value. Such flexibility in adjusting stiffness may permit some degree of precision in cancelling a perturbing force. One may note that in general each bending mode may have a different center of mass integration and may possibly vary in a different direction. These variations may be accommodated by changing the stiffness of each piezoelectric elements 172, 174, 176, 178 for each critical rotation speed (i.e., each rotation speed at which a resonant frequency of deformation may be experienced). It would be advantageous to be able to adjust each respective stiffness to any value between respective minimum and maximum values.

While piezoelectric unit 170 includes four piezoelectric elements 172, 174, 176, 178, similar utility in altering center of mass may be effected with any plurality of piezoelectric elements, preferably three or more.

If the direction at which the perturbing force acts is not along X-axis 138, then stiffness of piezoelectric elements 172, 174, 176, 178 may need to be adjusted accordingly. For example, if the integrated perturbation force is at 45 degrees to X-axis 138, toward Y-axis 136, then only piezoelectric elements 174, 178 may require adjustment, so long as piezoelectric elements 172, 176 have substantially the same stiffness. By independently varying the relative stiffness of piezoelectric elements 172, 174, 176, 178, any direction of imbalance may be accommodated.

Substantially continuous varying of stiffness may be effected by operating each respective light source in a pulsed mode. On-time and off-time may be controlled to determine the periods during which a respective piezoelectric element 172, 174, 176, 178 may be in a shorted orientation or an open orientation. A respective piezoelectric element 172, 174, 176, 178 and its respective associated electric network connecting the electrodes may behave electrically like an RC (Resistive—Capacitive) circuit, with the respective piezoelectric element 172, 174, 176, 178 behaving like a capacitor, the wire connecting the electrodes behaving like a resistor and the photodiode behaving like an on/off switch. The state of charge of the "capacitor" may be determined by the time-ratio of on-to-off. The switching frequency may be much larger than the rotational frequency of the rotor, such as tube 32 (FIG. 2).

Figure 8:
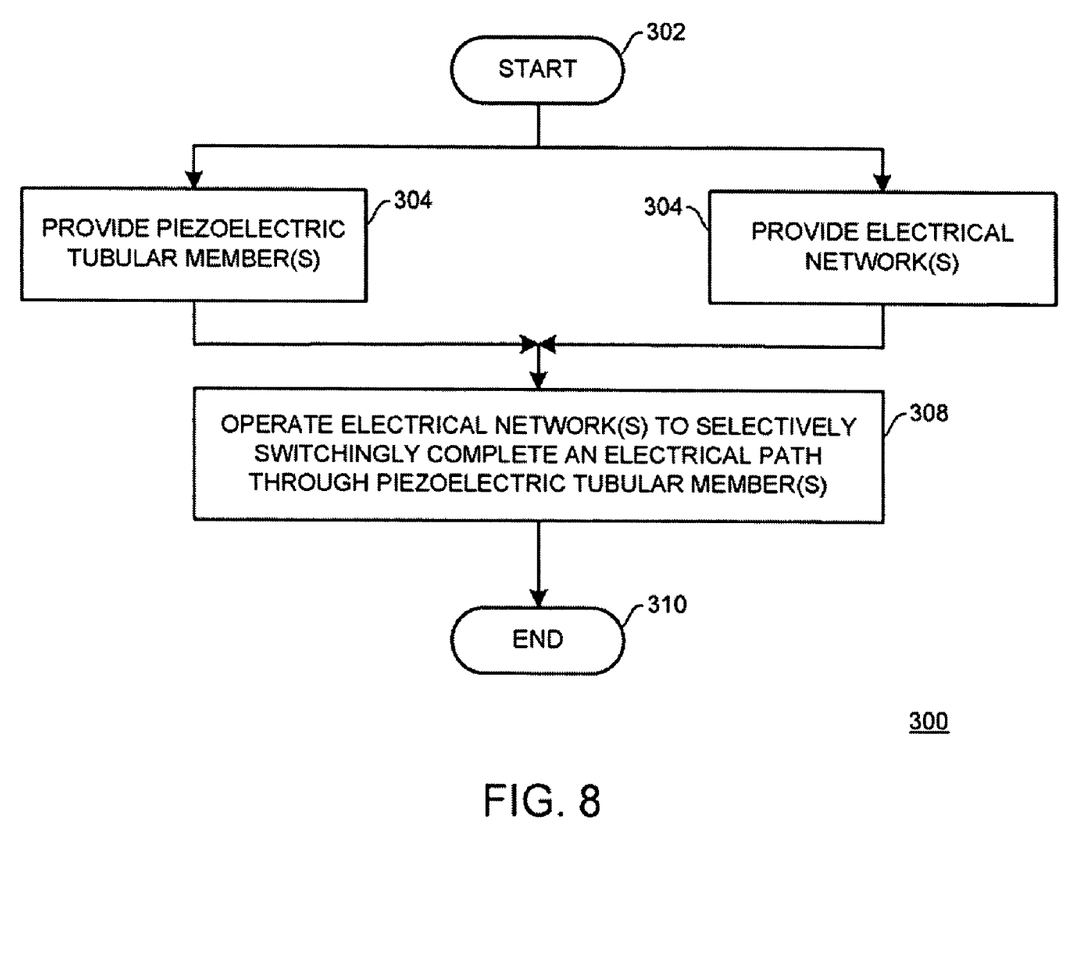
FIG. 8 is a flow chart illustrating the method of the present invention.

FIG. 8 is a flow chart illustrating the method of the present invention. In FIG. 8, a method 300 for changing at least one characteristic of a shaft oriented longitudinally about an axis begins at a START locus 302. Method 300 continues with, in no particular order: (1) providing at least one piezoelectric tubular member in a substantially press-fit relation coaxial with the shaft, as indicated by a block 304; and (2) providing at least one electrical network coupled with the piezoelectric tubular member, as indicated by a block 306.

Method 300 continues with operating the at least one electrical network to selectively switchingly complete an electrical path through the piezoelectric tubular member, as indicated by a block 308. Method 300 terminates at an END locus 310.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

I claim:

1. An apparatus comprising: a shaft being oriented about a longitudinal axis; a piezoelectric tubular member in a substantially oscullatory coaxial relation with at least a portion of said shaft; and at least one electrical network coupled with said piezoelectric tubular member for switchingly completing at least one electrical path through said piezoelectric tubular member; said piezoelectric tubular member having a first stiffness when said at least one electrical path is completed; said piezoelectric tubular member having a second stiffness when said at least one electrical path is not completed; said piezoelectric tubular member being situated between said axis and said shaft; said piezoelectric tubular member being polarized; said at least one electrical network including a photoelectric switching element for effecting said switching completion and a light source for controlling said photoelectric switching element; said light source being situated remotely from said shaft aimed for selectively illuminating said photoelectric switching element; said at least one physical parameter including frequency of at least one vibrational mode of said shaft.

2. An apparatus comprising: a shaft being oriented about a longitudinal axis; a piezoelectric tubular member in a substantially oscullatory coaxial relation with at least a portion of said shaft; and at least one electrical network coupled with said piezoelectric tubular member for switchingly completing at least one electrical path through said piezoelectric tubular member; said piezoelectric tubular member having a first stiffness when said at least one electrical path is completed; said piezoelectric tubular member having a second stiffness when said at least one electrical path is not completed; said shaft being situated between said piezoelectric tubular member and said axis; said piezoelectric tubular member being polarized; said at least one electrical network including a photoelectric switching element for effecting said switching completion and a light source for controlling said photoelectric switching element; said light source being situated remotely from said shaft aimed for selectively illuminating said photoelectric switching element; said at least one physical parameter including frequency of at least one vibrational mode of said shaft.

3. An apparatus comprising: a shaft being oriented about a longitudinal axis; a piezoelectric tubular member in a substantially oscullatory coaxial relation with at least a portion of said shaft; and at least one electrical network coupled with said piezoelectric tubular member for switchingly completing at least one electrical path through said piezoelectric tubular member; said piezoelectric tubular member having a first stiffness when said at least one electrical path is completed; said piezoelectric tubular member having a second stiffness when said at least one electrical path is not completed; said piezoelectric tubular member being situated between said axis and said shaft; said piezoelectric tubular member being polarized; said piezoelectric tubular member being arranged in segments presenting a plurality of generally longitudinal dividing gaps among said segments; said each respective electrical network of said at least one electrical network including a respective photoelectric switching element for effecting said switching completion and a respective light source for controlling a respective said photoelectric switching element; said light source being situated remotely from said shaft aimed for selectively illuminating a respective said photoelectric switching element.

4. An apparatus comprising: a shaft being oriented about a longitudinal axis; a piezoelectric tubular member in a substantially oscullatory coaxial relation with at least a portion of said shaft; and at least one electrical network coupled with said piezoelectric tubular member for switchingly completing at least one electrical path through said piezoelectric tubular member; said piezoelectric tubular member having a first stiffness when said at least one electrical path is completed; said piezoelectric tubular member having a second stiffness when said at least one electrical path is not completed; said shaft being situated between said piezoelectric tubular member and said axis; said piezoelectric tubular member being polarized; said piezoelectric tubular member being arranged in segments presenting a plurality of generally longitudinal dividing gaps among said segments; each respective electrical network of said at least one electrical network including a respective photoelectric switching element for effecting said switching completion and a respective light source for controlling a respective said photoelectric switching element; each said respective light source being situated remotely from said shaft aimed for selectively illuminating a respective said photoelectric switching element.

5. An apparatus comprising: at least one piezoelectric tubular member in a substantially press-fit relation substantially coaxial with a shaft oriented longitudinally about an axis; and at least one electrical network coupled with said piezoelectric tubular member for switchingly completing at least one electrical path through said piezoelectric tubular member; said piezoelectric tubular member having a first stiffness when said at least one electrical path is completed; said piezoelectric tubular member having a second stiffness when said at least one electrical path is not completed; said piezoelectric tubular member being situated between said axis and said shaft; said piezoelectric tubular member is polarized; said at least one electrical network including a photoelectric switching element for effecting said switching completion and a light source for controlling said photoelectric switching element; said light source being situated remotely from said shaft aimed for selectively illuminating said photoelectric switching element.

6. An apparatus as recited in claim 5 wherein said piezoelectric tubular member is arranged in segments presenting a plurality of generally longitudinal dividing gaps among said segments, and wherein said each respective electrical network of said at least one electrical network includes a respective photoelectric switching element for effecting said switching completion and a respective light source for controlling a respective said photoelectric switching element; each said respective light source being situated remotely from said shaft aimed for selectively illuminating a respective said photoelectric switching element.

7. An apparatus comprising: at least one piezoelectric tubular member in a substantially press-fit relation substantially coaxial with a shaft oriented longitudinally about an axis; and at least one electrical network coupled with said piezoelectric tubular member for switchingly completing at least one electrical path through said piezoelectric tubular member; said piezoelectric tubular member having a first stiffness when said at least one electrical path is completed; said piezoelectric tubular member having a second stiffness when said at least one electrical path is not completed; said piezoelectric tubular member being situated between said piezoelectric tubular member and said axis; said piezoelectric tubular member is polarized; said at least one electrical network including a photoelectric switching element for effecting said switching completion and a light source for controlling said photoelectric switching element; said light source being situated remotely from said shaft aimed for selectively illuminating said photoelectric switching element.

8. An apparatus as recited in claim 7 wherein said piezoelectric tubular member is arranged in segments presenting a plurality of generally longitudinal dividing gaps among said segments, and wherein said each respective electrical network of said at least one electrical network includes a respective photoelectric switching element for effecting said switching completion and a respective light source for controlling a respective said photoelectric switching element; each said respective light source being situated remotely from said shaft aimed for selectively illuminating a respective said photoelectric switching element.

* * * * *